United States Patent [19]

Greiss et al.

[11] Patent Number: 5,245,632
[45] Date of Patent: Sep. 14, 1993

[54] SYNCHRONOUS FSK DETECTION

[75] Inventors: Israel Greiss, Raanana; Eran Gluska, Tel Aviv, both of Israel

[73] Assignee: National Semiconductor Corporation, Santa Clara, Calif.

[21] Appl. No.: 887,106

[22] Filed: May 19, 1992

Related U.S. Application Data

[63] Continuation of Ser. No. 564,831, Aug. 8, 1990, abandoned.

[51] Int. Cl.$^5$ .............................................. H04L 27/14
[52] U.S. Cl. ...................... 375/82; 329/302; 375/88; 375/97
[58] Field of Search ............... 375/9, 80, 81, 82, 88, 375/97; 331/1 A; 329/302, 303, 307, 309, 343; 455/257, 259, 260, 265

[56] References Cited

U.S. PATENT DOCUMENTS

| | | | |
|---|---|---|---|
| 4,203,071 | 5/1980 | Bowles et al. | 375/97 |
| 4,726,043 | 2/1988 | Levesque | 375/97 |
| 4,759,036 | 7/1988 | Meyers | 375/97 |
| 4,815,103 | 3/1989 | Cupo et al. | 375/14 |

Primary Examiner—Benedict V. Safourek
Attorney, Agent, or Firm—Limbach & Limbach

[57] ABSTRACT

The present invention provides methods and apparatus for synchronous detection of a Frequency Shift Keying (FSK) signal. The demodulation of the FSK signal is performed in the "complex plane" after multiplying the input samples by an unlocked complex carrier in a complex down converter. Two decision bits are generated per real bit. Once bit should be the real decision; the other bit is a "transition" bit between two Bauds. To generate this situation, the last three decisions are considered. If a transition from 0 to 1, or vice-versa, occurs between the first and third bit, then the middle (second) bit should have equal probability to be 0 or 1. If it is 1, timing correction, by moving the sampling window, is done towards the 0 bit. If it is a 0, the sampling window is moved toward the 1 bit. The timing decision is efficiently implemented by taking the three bits as an index to an 8-entry look-up table that generates ADVANCE, DELAY or NO—$_{OP}$ directions.

2 Claims, 16 Drawing Sheets

| INSTRUCTION | OPC1 | OPC0 | CLR | COJ | OPERATION | CYCLES |
|---|---|---|---|---|---|---|
| VCMAD | 0 | 0 | 0 | 0 | C [i] <= C [i] + YxD [i] | 9 + (Nx8) |
|  | 0 | 0 | 0 | 1 | C [i] <= C [i] +YxD [i]* |  |
|  | 0 | 0 | 1 | 0 | C [i] <= YxDE [i] |  |
|  | 0 | 0 | 1 | 1 | C [i] <= YxD [i]* |  |
| VCMUL | 0 | 1 | 0 | 0 | C [i] <= C [i] x (1+D[i] ) | 9 + (Nx8) |
|  | 0 | 1 | 0 | 1 | C [i] <= C [i] x (1+D[i]*) |  |
|  | 0 | 1 | 1 | 0 | C [i] <= C [i] x D [i] |  |
|  | 0 | 1 | 1 | 1 | C [i] <= C [i] x D [i]* |  |
| VCMAC | 1 | 0 | 0 | 0 | A <= A + SIGMA ( C [i] x D [i] ) | 6 + (Nx8) |
|  | 1 | 0 | 0 | 1 | A <= A + SIGMA ( C [i] x D [i]*) |  |
|  | 1 | 0 | 1 | 0 | A <= SIGMA ( C [i] x D [i] ) |  |
|  | 1 | 0 | 1 | 1 | A <= SIGMA ( C [i] x D [i]*) |  |
| VCMAG | 1 | 1 | 0 | 0 | A <= A + SIGMA ( C [i] x C[i] ) | 5 + (Nx8) |
|  | 1 | 1 | 0 | 1 | A <= A + SIGMA ( C [i] x C[i]*) |  |
|  | 1 | 1 | 1 | 0 | A <= SIGMA ( C [i] x C [i] ) |  |
|  | 1 | 1 | 1 | 1 | A <= SIGMA ( C [i] x C [i]*) |  |

FIG. 7

| DS1 | DS0 | EXTERNAL BUFFER SIZE (DM) | CONSTANT ADDRESS BITS | INCREMENTED ADDRESS BITS |
|---|---|---|---|---|
| 0 | 0 | 8 | A0, A5 – A23 | A1 – A4 |
| 0 | 1 | 16 | A0, A6 – A23 | A1 – A5 |
| 1 | 0 | 32 | A0, A7 – A23 | A1 – A6 |
| 1 | 1 | 64 | A0, A8 – A23 | A1 – A7 |

FIG. 8

INITIALIZATIONS:

MODEM_FED <-- 0
MODEM_CDET <-- 0
drop_count <-- 0
bits <-- 0
afe_gain <-- 0
even_bit <-- TRUE
sincos <-- 0
data_reg <-- 0
timing_done <-- FALSE
timing_direction <-- TIME_OK
dpos <-- 0
ppos <-- 0
buf_read <-- 0
buf_write <-- 0
first <-- TRUE

V.21 TIMING RECOVERY

| $X_2$ | $X_1$ | $X_0$ | Op |
|---|---|---|---|
| 0 | 0 | 0 | * |
| 0 | 0 | 1 | advance − |
| 0 | 1 | 0 | * |
| 0 | 1 | 1 | delay |
| 1 | 0 | 0 | delay |
| 1 | 0 | 1 | * |
| 1 | 1 | 0 | advance |
| 1 | 1 | 1 | * |

Goal : In case of transition,
   prob $(x_1 = 1)$ = prob $(x_1 = 0)$
   (transition decision is in the middle)

Implementation : Table lookup on : $X_0 X_1 X_2$

SYNCHRONOUS FSK DETECTION

This is a continuation of co-pending application Ser. No. 07/564,831 filed on Aug. 8, 1990, now abandoned.

BACKGROUND OF THE INVENTION

1. Field of the Invention

The present invention relates to timing recovery in a data communications system and, in particular, to synchronous detection of a Frequency Shift Keying (FSK) signal in a modem receiver.

2. Discussion of the Prior Art

The basic function of any communications system is to transmit information over a communication channel from an information source to a destination as fast and as accurately as possible.

There are two general types of information sources. Analog sources, such as a telephone microphone, generate a continuous signal. Digital sources, such as a digital data processing system, generate a signal that consists of a sequence of pulses.

Communications channels that are designed to transmit analog signal (e.g., the telephone network) have characteristics which make it difficult for them to transmit digital signals. To permit the transmission of digital pulse streams over an analog channel, it is necessary to utilize the digital data pulses to modulate a carrier waveform that is compatible with the analog transmission channel.

The equipment that performs the required modulation is generally referred to as a "MODEM". The term "MODEM" is an acronym for MOdulator-DEModulator, since one piece of equipment typically includes the capability not only to modulate transmitted signals, but also to demodulate received signals to recover the digital data from the modulated analog carrier waveform.

While passing through the transmission channel, the modulated carrier waveform suffers from distortion introduced both by the system itself and by noise contamination. Thus, one of the tasks of the modem's demodulating receiver function is to filter the signal received from the transmission channel to improve the signal-to-noise ratio. The modem receiver also recovers timing information from the received signal to provide sampling points for recovering the digital data. The modem receiver may also condition the data in other ways to make it suitable for additional processing.

In a conventional modem, the signal filtering, timing recovery and conditioning tasks are performed by three functional units: analog-to-digital conversion circuitry ("analog front end") that converts the received modulated carrier waveform to a digitized replica, a digital signal processor (DSP) that retrieves the digital data from the digitized replica using a recovered timing signal, and a control function for controlling both the analog front end and the DSP. The DSP recovers the data by implementing a signal conditioning and data recovery algorithm that is specific to the type of data being received.

For example, the DSP function in a facsimile (fax) machine modem implements a special purpose algorithm that can only be used for recovering digital fax data. In the case of a fax system, the data to be recovered is a digital bit map that corresponds to the transmitted hard copy image and which has been compressed to facilitate efficient transmission. The algorithm implemented by the digital signal processor function of the receiving fax machine's modem is a dedicated "fax" algorithm that has been designed specifically for accurately recovering the compressed bit map. It cannot recover digital data in a format other than a compressed bit map, e.g. voice mail data or data modem applications. A different digital signal processor implementing a different dedicated "voice mail" or "data modem" algorithm is needed for each of these other applications.

As shown in FIG. 1, a conventional fax machine architecture may be partitioned into two major functional blocks: a special purpose fax modem block 1 of the type described above for recovering a compressed bit map from a modulated carrier waveform and a general purpose processor block 2 for performing those tasks required to convert the compressed bit map to a corresponding hard copy image.

Data transmission systems that operate at low transmission rates, i.e. 1200 baud or less, typically utilize a modulation technique known as Frequency Shift Keying (FSK). According to the FSK technique, the two binary states are represented by two different frequencies and are detected using two frequency tuned sections, one tuned to each of the two frequencies. The demodulated signals are then integrated over the duration of a bit period and a binary decision is made based on the result.

A common disadvantage of conventional analog FSK demodulator circuits is that they are sensitive to circuit parameter variations and are not suitable for large scale integration.

Conventional digital FSK demodulator signal processing requires A/D converters, high power consumption and very high system clocking frequencies which results in major expenditures for RFI shielding.

Moreover, conventional FSK modems are asynchronous modems that are used to transfer asynchronous data over the communication link, usually with start and stop delimiters. When synchronous data are to be transmitted through such a modem, a bit synchronizer (FIG. 2) must be added to the modem in order to synchronize on the exact timing. Combining the modem receiver and bit synchronization functions in cascade (i.e. asynchronous detection and timing) is inefficient and results in reduced performance.

SUMMARY OF THE INVENTION

The present invention provides methods and apparatus for synchronous detection of a Frequency Shift Keying (FSK) signal. The demodulation of the FSK signal is performed in the "complex plane" after multiplying the input samples by an unlocked complex carrier in a complex down converter. Two decision bits are generated per real bit. One bit is the real decision; the other bit is a "transition" bit between two successive symbols. To generate this situation, the last three decisions are considered. If a transition from 0 to 1, or vice-versa, occurs between the first and third bit, then the middle (second) bit has equal probability to be 0 or 1. If it is 1, then timing correction is performed by moving the sampling window towards the 0 bit. If it is a 0, then the sampling window is moved toward the 1 bit. The timing decision is efficiently implemented by taking the three bits as an index to an 8-entry look-up table that generates ADVANCE, DELAY or NO$_{op}$ directions.

A better understanding of the features and advantages of the present invention will be obtained by reference to the following detailed description and accompanying drawings which set forth an illustrative embodiment in which the principles of the invention are utilized.

DESCRIPTION OF THE DRAWINGS

FIG. 7 provides an instruction set summary for a DSP module utilizable in accordance with the present invention.

FIG. 8 is a table illustrating the handling of cyclic buffers for a DSP module utilizable in accordance with the present invention.

DETAILED DESCRIPTION OF THE INVENTION

Figure 1:
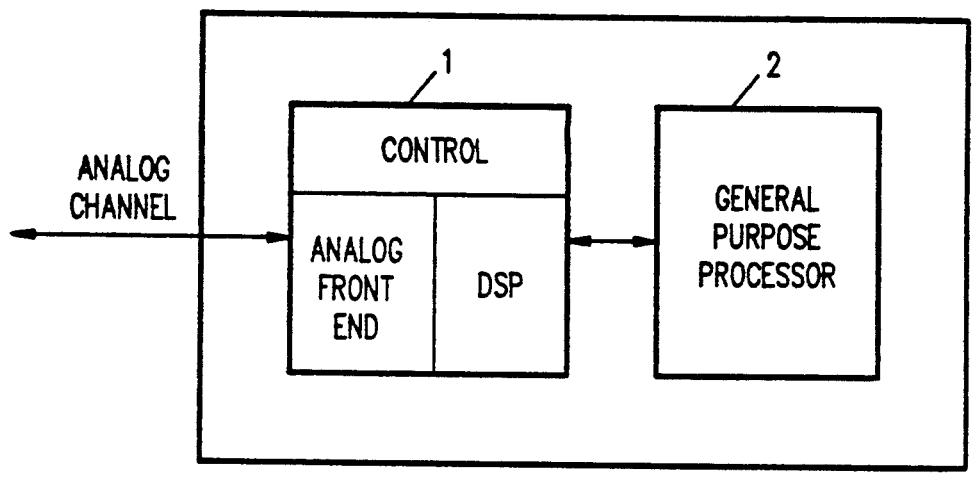
FIG. 1 is a block diagram illustrating the basic functional partitioning of a conventional facsimile system.
Figure 2:
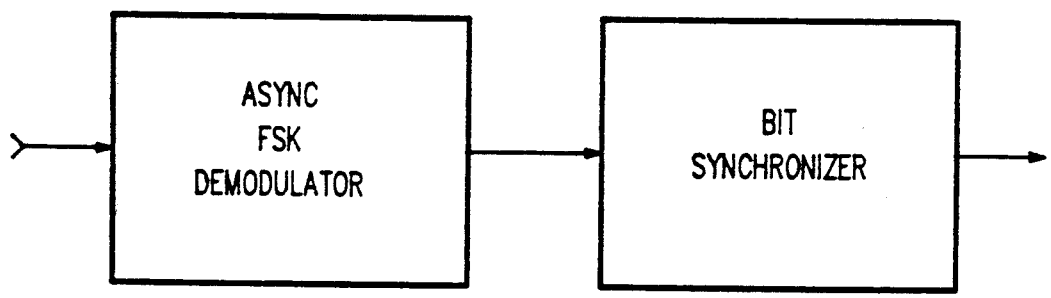
FIG. 2 is a block diagram illustrating a conventional FSK modem receiver with an added bit synchronizer for passing synchronous data.
Figure 3:
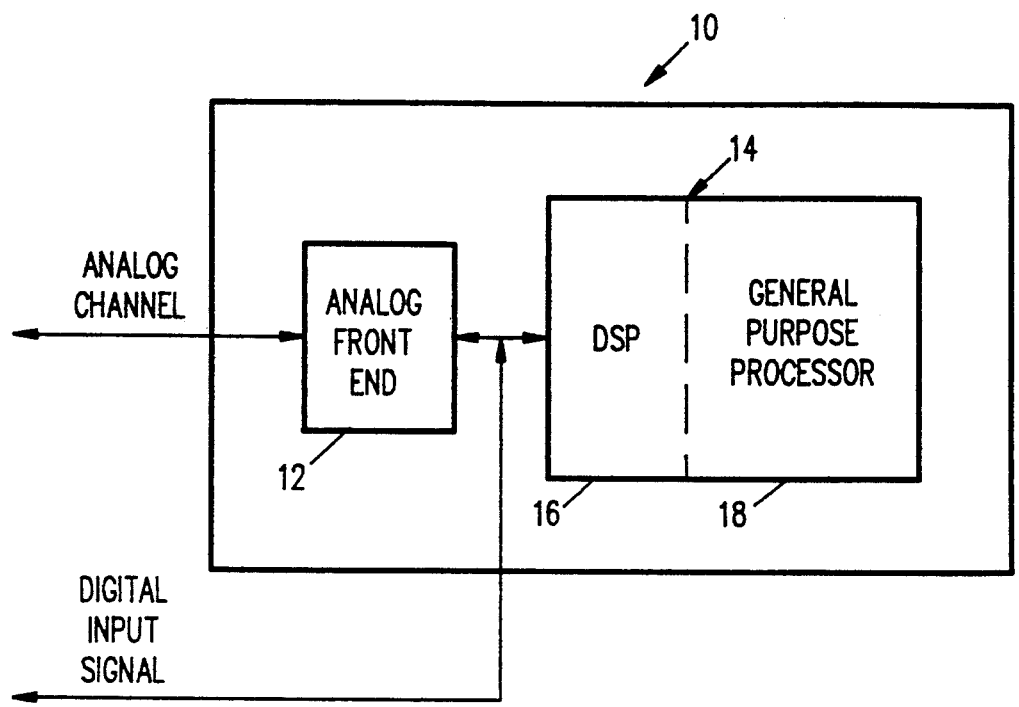
FIG. 3 is a block diagram illustrating the basic functional partitioning of a data processing system utilizable in accordance with the present invention.

FIG. 3 shows a data processing system 10 that includes two primary functional elements: an analog front end 12 and an integrated processing platform 14. The integrated processing platform 14 includes both a digital signal processor (DSP) module 16 and a general purpose processor (GPP) 18.

The analog front end 12 converts a modulated input signal received from an analog transmission channel, e.g. a telephone line, to a digitized replica of the modulated input signal. The analog front end 12 can be implemented utilizing conventional, off-the-shelf integrated circuit products available for this purpose.

As stated above, the integrated processor platform 14 includes a DSP module 16 that recovers digital data from the digital signal generated by the analog front end 12. The DSP module 16 includes a processing mechanism, described in greater detail below, that conditions the digital signal utilizing an algorithm comprising a selected sequence of DSP operations.

The general purpose processor 18 controls the DSP module 16 and processes the digital data generated by the DSP module 16 to a desired end result. The general purpose processor 18 may be any conventional state-of-the-art microprocessor.

As further shown in FIG. 3, while in many applications, the analog front end 12 will be utilized to convert a modulated input signal received on an analog channel to a corresponding digital signal, there are a growing number of applications (e.g., ISDN and T1) in which a digital input signal will be received by the integrated processor platform 14 directly from a digital source.

Figure 4:
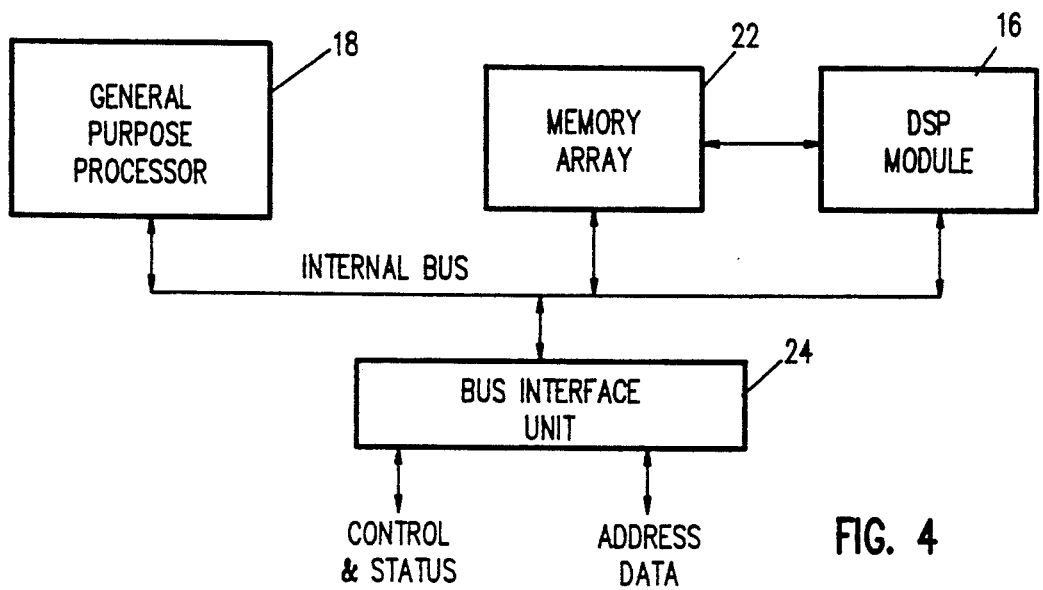
FIG. 4 is a block diagram illustrating the primary functional units of a data processing system in accordance with the present invention.

Referring to FIG. 4, both the DSP module 16 and the general purpose processor 18 are connected to an internal bus 20, allowing both the DSP module 16 and the general purpose processor 18 to communicate with a system memory (not shown) via a conventional bus interface unit 24 for transfer of control/status information and addresses/data therebetween. It will be understood by those skilled in the art that the internal bus 20 comprises both an internal address bus for handling address references by both the DSP module 16 and the general purpose processor 18 and an internal data bus for handling instruction and data transfers.

To save bus bandwidth, the DSP module 16 stores operands used in executing DSP algorithms in an internal RAM memory array 22 which, as will be described in greater detail below, is also accessible to the general purpose processor 18. That is, the internal memory array 22 serves as a shared resource for both the DSP module 16 and the general purpose processor 18. In the illustrated embodiment, the internal memory is shown as accessible by the DSP module 16 and the general purpose processor 18 via the internal bus 20. It will be understood by those skilled in the art that other bus structures would also provide the desired shared accessibility to the internal memory array 22; for example, the internal memory array 22 could be implemented as a dual port memory.

The DSP module 16 may fetch operands in parallel from the internal memory array 22 and system memory.

The DSP module 16 executes vector operations on complex variables that are optimized for DSP applications. The general purpose processor 18 treats the DSP module 16 as a memory mapped I/O device that occupies a reserved memory space, interfacing with the DSP module 16 via a set of memory mapped registers.

Figure 5:
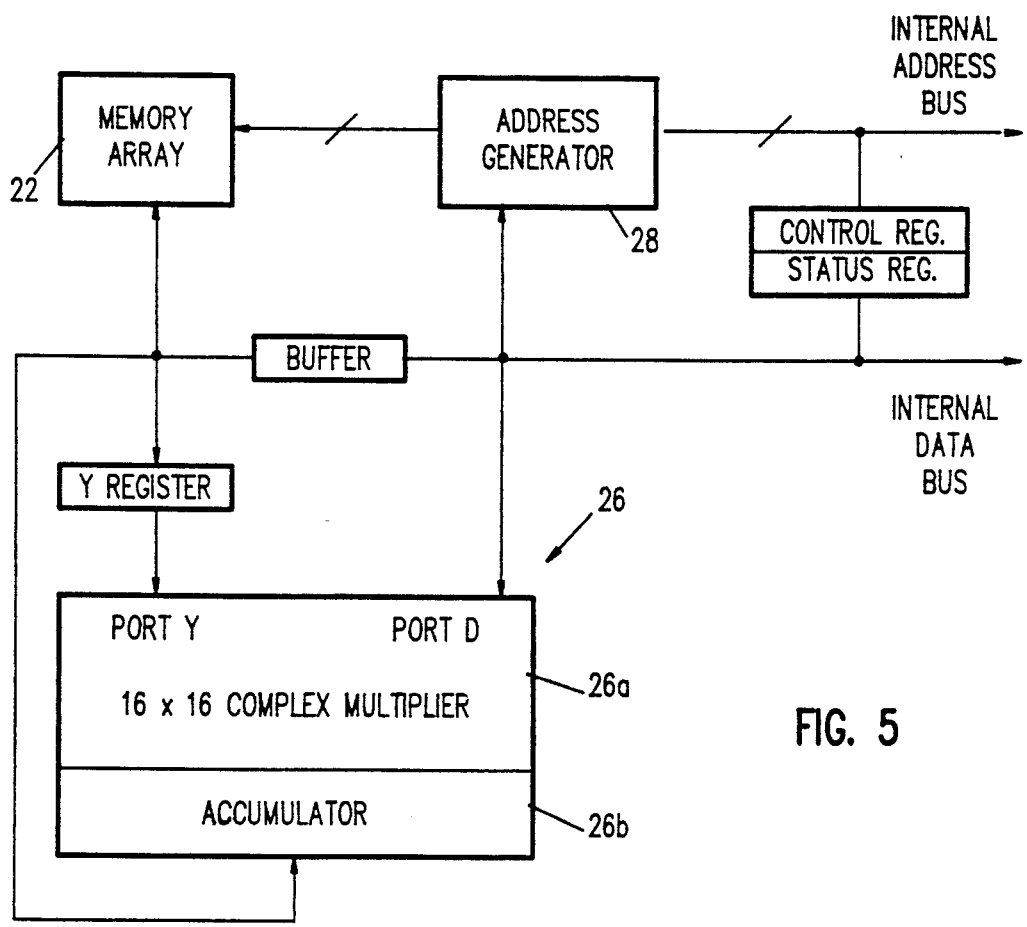
FIG. 5 is a block diagram illustrating a DSP module utilizable in a data processing system utilizable in accordance with the present invention.

As shown in FIG. 5, the DSP module 16 use the internal shared memory array 22 as well as a multiplier-/accumulator 26. The DSP module 16 also includes its own internal address generator 28 for system memory and internal operand accesses, thus reducing the load on the general purpose processor 18. Both the multiplier-/accumulator 26 and the address generator 28 are conventional implementations.

In the operation of the data processing system 10, the general purpose processor 18 selects from a basic set of DSP operations to define a specific sequence of operations as the DSP algorithm to be executed by the DSP module 16 for recovering data from the incoming digital signal. The general purpose processor then retrieves operands required for execution of the selected DSP algorithm, and/or instructions and data critical to the general purpose processor for controlling the DSP module 16 or for performing general purpose tasks, and loads them into the internal RAM array 22. The general purpose processor then invokes the first DSP operation in the selected sequence by issuing the corresponding command to the control register of the DSP module 16. The DSP module then places the general purpose processor 18 in a continuous wait state while it performs the first DSP operation utilizing operands retrieved by the address generator 28 from the RAM array 22 and system memory. Upon completion of the DSP operation, the DSP module cancels the continuous wait state and the general purpose processor 18 then either reads the status of the DSP module 16 or the result of the DSP operation or carries on with the execution of its normal program flow, which may be either invoking the next DSP operation in the selected sequence by issuing the appropriate command to the DSP module control register or performance of a general purpose task. This process continues until the selected sequence of DSP operations has been completed. The general purpose processor may then download the contents of the shared internal RAM array 22 and retrieve a new set of operands, instructions and data for further DSP operations or general purpose processing tasks.

As further shown in FIG. 5, the DSP module 16 performs complex arithmetic calculations on two vector operands provided to the multiplier/accumulator 26 at Port Y and Port D. One vector is retrieved from the internal memory array 22. The other vector is either organized as a circular buffer in the system memory (described in greater detail below) or retrieved from the internal memory array 22.

The DSP module 16 executes vector operations in a two stage pipeline. This allows for a significant performance enhancement as the fetch and execution of operands for consecutive vector elements are performed simultaneously rather than in a strictly sequential manner. The DSP module 16 can fetch up to two data elements at a time, using its address generator 28 for system memory access and the internal array 22 for the second operand. While fetching operands for one vector element, the DSP module 16 performs the multiply and add operations on the previous vector element.

The DSP module 16 contains seven registers in addition to the RAM array 22. These registers, as well as the internal memory array 22, are accessed by the general purpose processor 18 as memory-mapped I/O devices. Each storage location in the internal memory array 22 is 32 bits wide and holds one complex number.

As stated above, the internal memory array 22 is not limited to storage of filtering coefficients for a specific DSP algorithm. It can also be used as a fast, zero-wait state, integrated memory for storing instructions and data utilized by the general purpose processor 18 as well as for storing selected operands for use by the DSP module 16 for processing a variety of data signal formats.

The memory array 22 can be used for instruction fetches with only one restriction: instructions must be loaded into the array 22 using word aligned accesses. This can be achieved by moving the aligned doubleword from system memory to memory array 22. Data can also be stored in the memory array 22 with one restriction: storing data in the array 22 can be done only if all the data is written using aligned word or doubleword accesses.

The multiplier input register Y is a 32-bit register that holds one complex operand. The multiplier input register Y is mapped into two consecutive words called Y0 and Y1.

The accumulator register A is a 32-bit register that holds one complex result. The A register is mapped into consecutive words, also called A0 and A1. Internally, A0 and A1 are 32-bit registers. However, only bits 15-30 (i.e., 16 bits) are visible. The rest of the bits are used for a higher dynamic range and intermediate calculations.

The operation of the DSP module 16 will now be described in greater detail; the following terms will be used in the operational description:

| | |
|---|---|
| C[i] | A complex entry in internal memory array 22, entry [i] can be selected by address generator 28 or directly accessed by CPU 18; |
| D[i] | Complex data from system memory fetched using address generator 28; |
| Y | Complex Multiplier input register 30 in FIG. 4; |
| D[i]* | The complex conjugate of D[i]; |
| A | Complex Accumulator register. |

The DSP module 16 executes the following six basic commands:

| | |
|---|---|
| VCMAC | Vector Complex Multiply Accumulate |
| VCMAG | Vector Complex Magnitude |
| VCMAD | Vector Complex Multiply Add |
| VCMUL | Vector Complex Multiply |
| LOAD | Write into C, Y, A or CTL |
| STORE | Read from C, Y, A, ST or CTL |

The VCMAC, VCMAD and VCMUL commands use the following parameters:

| | |
|---|---|
| D | Vector Start Address in system memory |
| C | Vector Start Address in internal RAM |
| | Vector Length |
| | Control bits |

The VCMAG command uses only the last three operands.

Complex numbers are organized in the internal memory array 22 as double words. Each double word contains two 16-bit 2's complement fixed-point fractional integers. The less significant word contains the Real part of the number. The most significant word contains the Imaginary part of the number.

Figure 6:
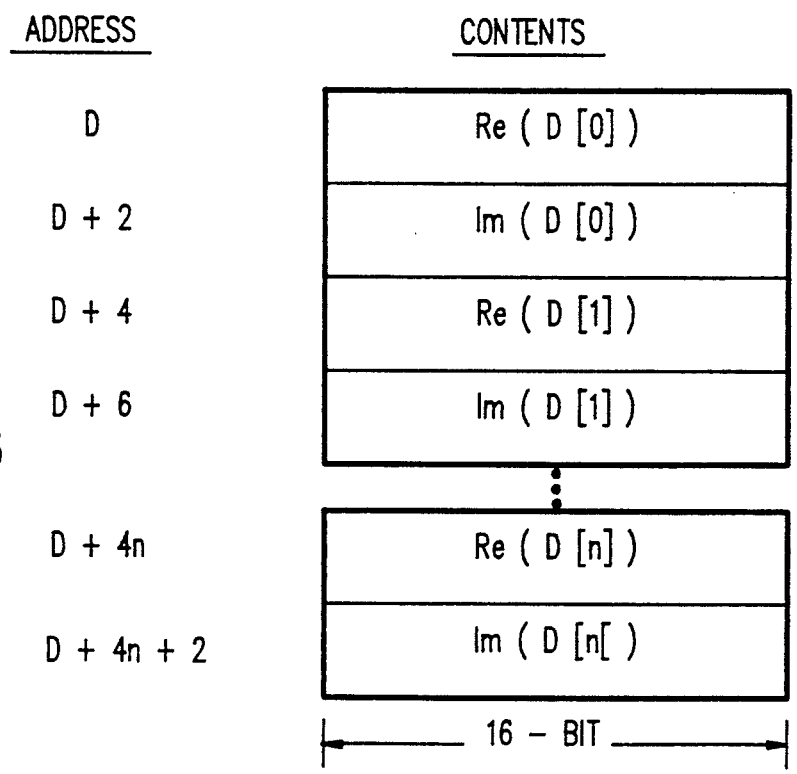
FIG. 6 is a table illustrating the memory organization of a complex vector for use in a DSP module utilizable in accordance with the present invention.

The complex vectors utilized by the DSP module 16 consist of arrays of complex numbers stored in consecutive addresses. Complex vectors must be aligned to double word boundary. FIG. 6 illustrates the memory organization of a vector D.

Referring back to FIG. 5, the arithmetic logic unit 26 of the DSP module 16 contains a 16×16 multiplier 26a and a 32-bit adder/accumulator 26b. Bits 15-30 (16 bits) of the result are rounded and can be read by accessing the A register. If an overflow is detected during an operation, the Status Register (ST) overflow bit and either the OP0 bit or the OP1 bit is set to "1."

When data is loaded into the adder/accumulator 26b, the 16 bits of data are loaded into bits 15-30, the lower bits are set to "0," while bit 31 gets the same value as bit 30 (sign extended). An overflow is detected whenever the value of bit 30 is different from the value of bit 31.

Each basic DSP operation or instruction to be performed by the DSP module 16 is controlled by two OP-code bits (OPC0 and OPC1) and two specifiers (COJ and CLR). COJ specifies whether the operand on port D of the multiplier 26a must be conjugated prior to multiplication. The CLR bit is used to extend the instruction set. On VCMAC and VCMAG, CLR specifies whether the accumulator 26b must be cleared at the beginning of the vector operation. On VCMAD, CLR specifies that the operation will ignore the value of C[i]. In VCMUL, CLR indicates that the value of D[i] is to be taken instead of 1+D[i].

FIG. 7 provides a summary of the set of basic DSP operations executed by the DSP module 16 as a function of the OPC1, OPC0, COJ, and CLR bits in the CTL register. In FIG. 7, "SIGMA" represents the summation sign $$\sum_{i=1}^{N}$$

All the operands are complex numbers. Thus, $A = -$ SIGMA $C[i] \times D[i]$ breaks down to:

Re(A)=Sigma
  {Re(C[i])×Re(D[i])−Im(C[i])×Im(D[i])}

Im(A)=Sigma
  {Re(C[i])×Im(D[i])+Im(C[i])×Re(D[i])}

The accumulator 26b, the multiplier input register Y, the external data pointer DPTR and the coefficient pointer CPTR registers are used as temporary registers during vector operations. Values stored in these register prior to activation of the DSP module 16 are destroyed. If the content of the accumulator register A after an operation of the DSP module 16 is used as an initial value for the next operation, it must be remembered that the least significant bits may contain a value of other than zero.

As stated above, the DSP module 16 accesses arrays of data in external memory using the DPTR pointer as an address. The DS0 and DS1 bits of the CTL register control the size of the array. The DSP module 16 allows a convenient way of handling data arrays as a FIFO. Only the appropriate number of the least significant bits of the DPTR are incremented on each access. The upper bits remain constant. FIG. 8 shows which bits are incremented. The rest remain constant.

Additional information regarding the data processing system 10 may be obtained by reference to co-pending and commonly-assigned U.S. Pat. application Ser. No. 467,148, INTEGRATED DIGITAL SIGNAL PROCESSOR/GENERAL PURPOSE CPU WITH SHARED INTERNAL MEMORY, filed Jan. 18, 1990 by Amos Intrater et al, which application is hereby incorporated by reference to provide additional background for the present invention.

In some applications, the signal received by the data processing system 10 may be a Frequency Shift Keying (FSK) signal. The present invention provides techniques for utilizing the system 10 for synchronizing recovery timing in an FSK signal with baud boundaries.

Figure 9:
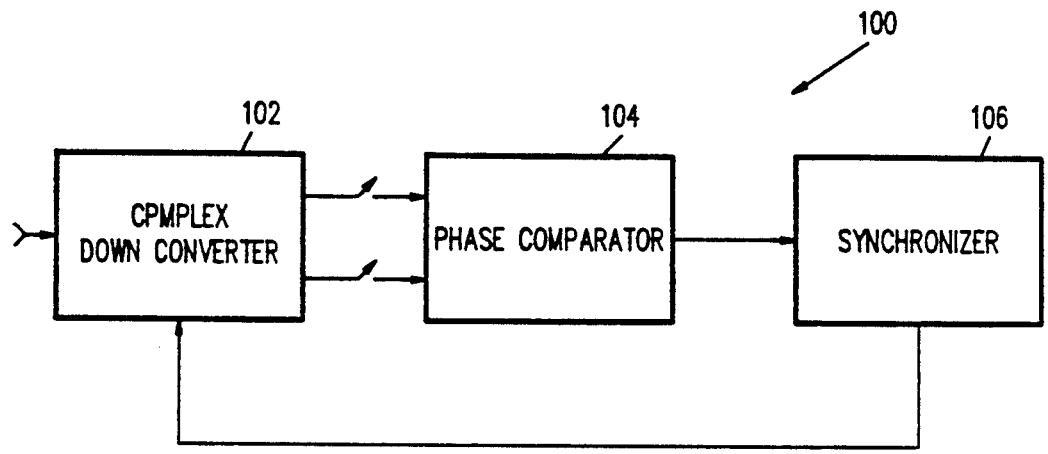
FIG. 9 is a general block diagram illustrating the basic architecture of a FSK modem receiver utilizable for synchronous detection of an FSK signal in accordance with the present invention.

FIG. 9 shows a block diagram of the basic architecture of a synchronous FSK detection module 100 in accordance with the invention. The module 100 consists of a complex down converter 102, a phase comparator 104, and synchronizer 106 that includes decision and timing logic.

The input signal to the module 100 is first translated to a digital format by, for example, a pulse code modulation (PCM) coder-decoder and then expanded to linear format. The sampling rate Fs is 9600 samples per second. Alternatively, the input signal can be directly connected to a PCM link or a linear A/D converter. Input samples are processed only at the Baud rate (300 times/sec.), the decimation factor 1:32 providing a major efficiency improvement over conventional FSK demodulation techniques.

Figure 10:
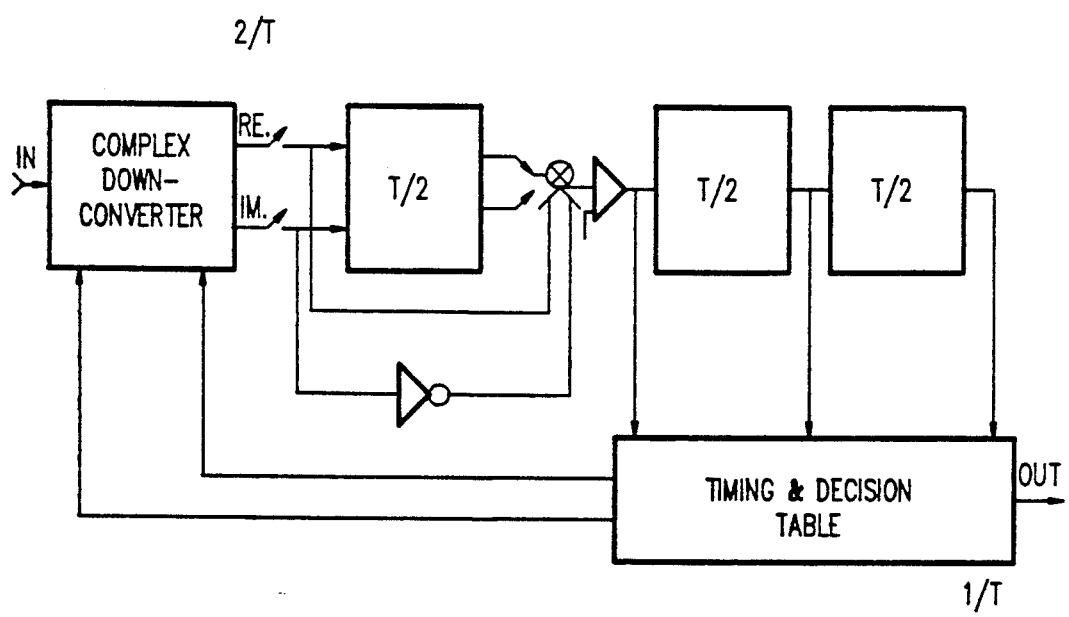
FIG. 10 is a more detailed version of the FIG. 9 block diagram.
Figure 11:
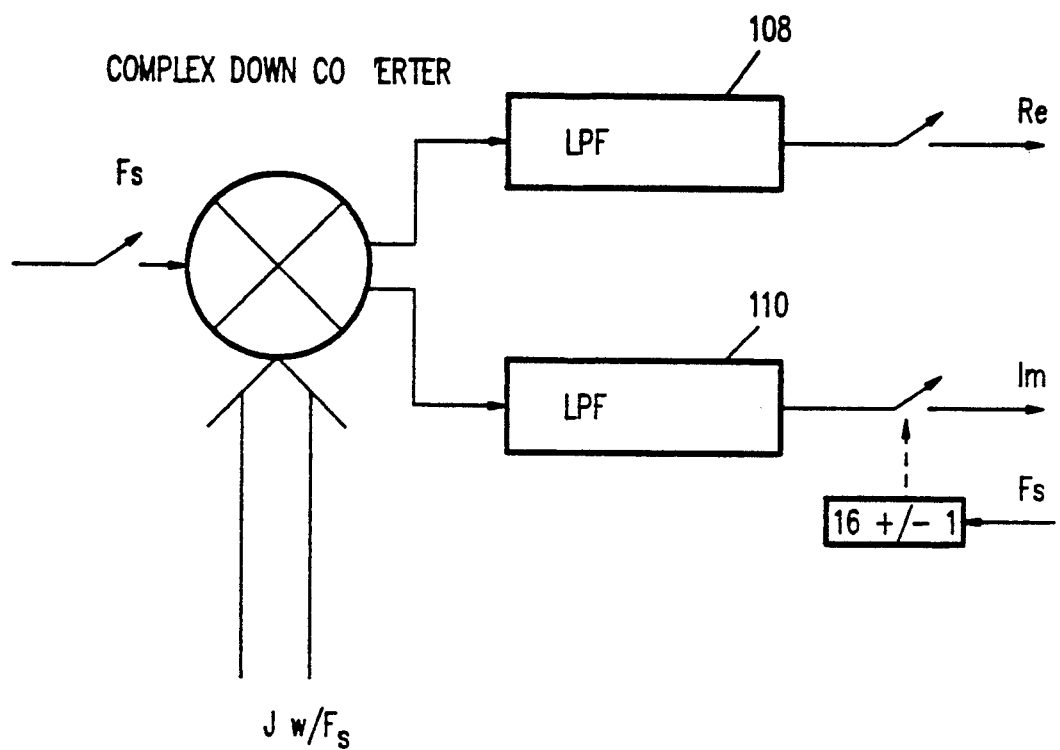
FIG. 11 is a block diagram illustrating a complex down converter utilizable in the FSK modem receiver shown in FIGS. 9 and 10.
Figure 12:
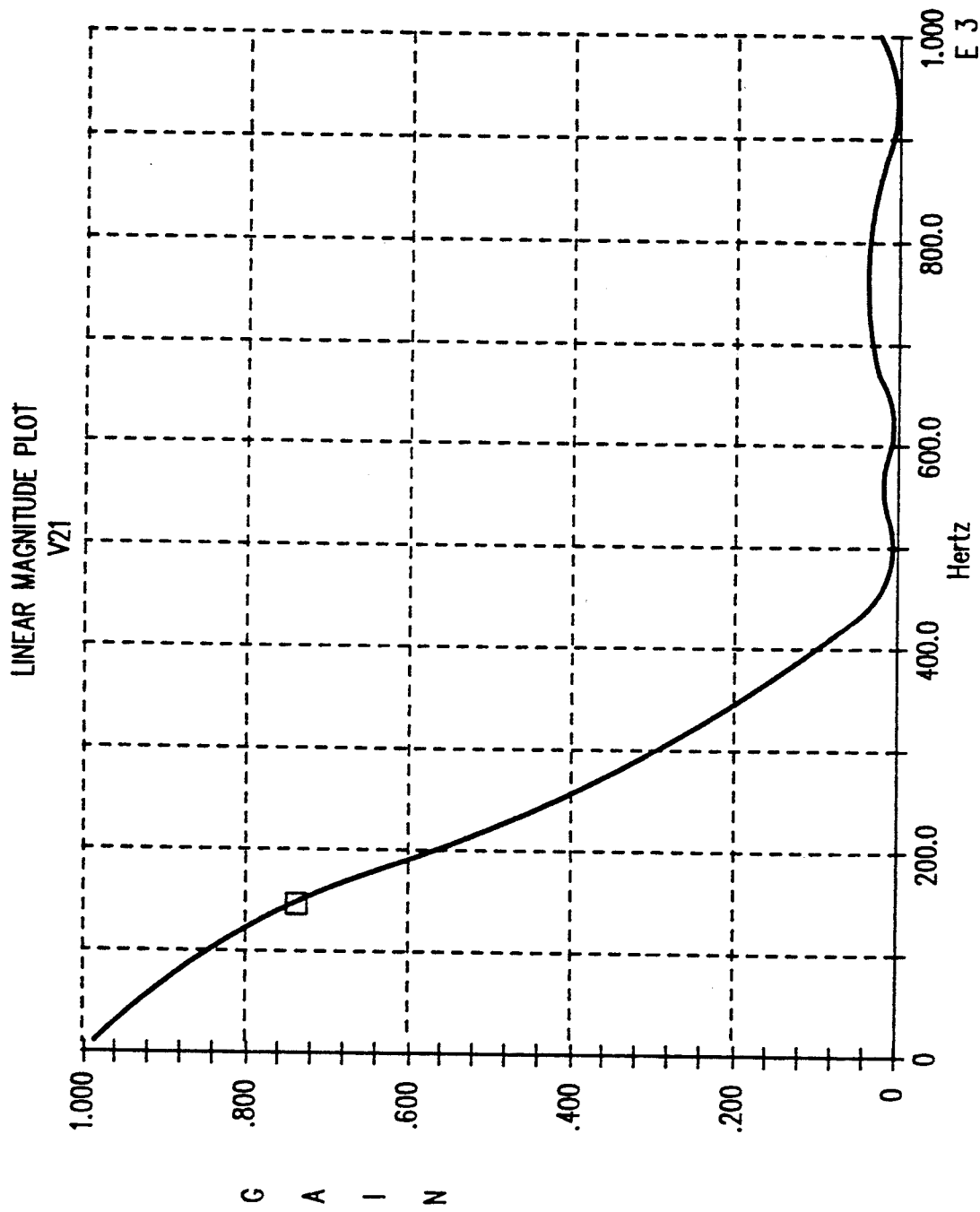
FIG. 12 is a graph illustrating the frequency response of a low pass filter for 300 bps reception.
Figure 13A:
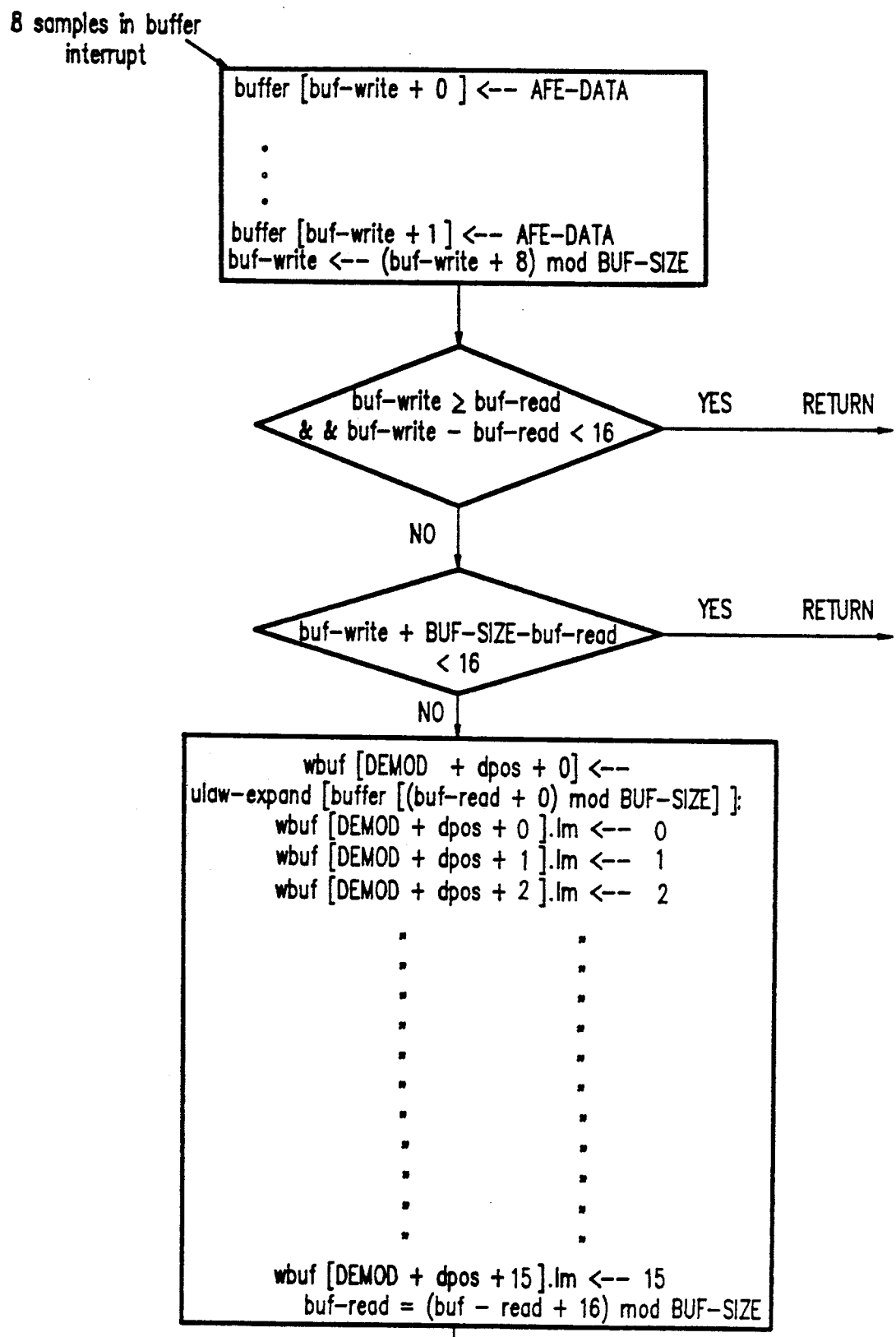
FIGS. 13A-13G combine to provide a flow chart illustrating implementation of a synchronized 300 bps FSK modem receiver in accordance with the present invention.
Figure 13B:
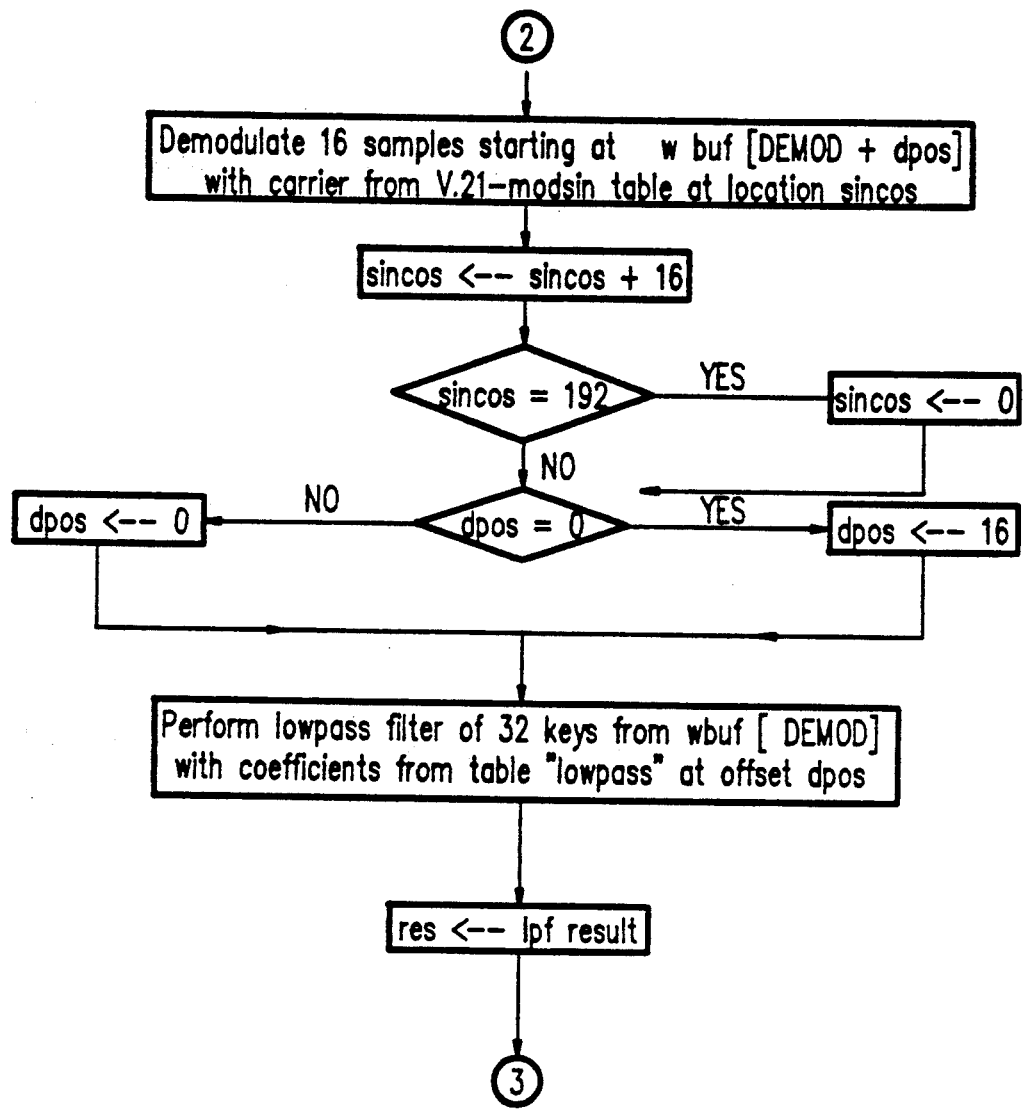
Figure 13C:
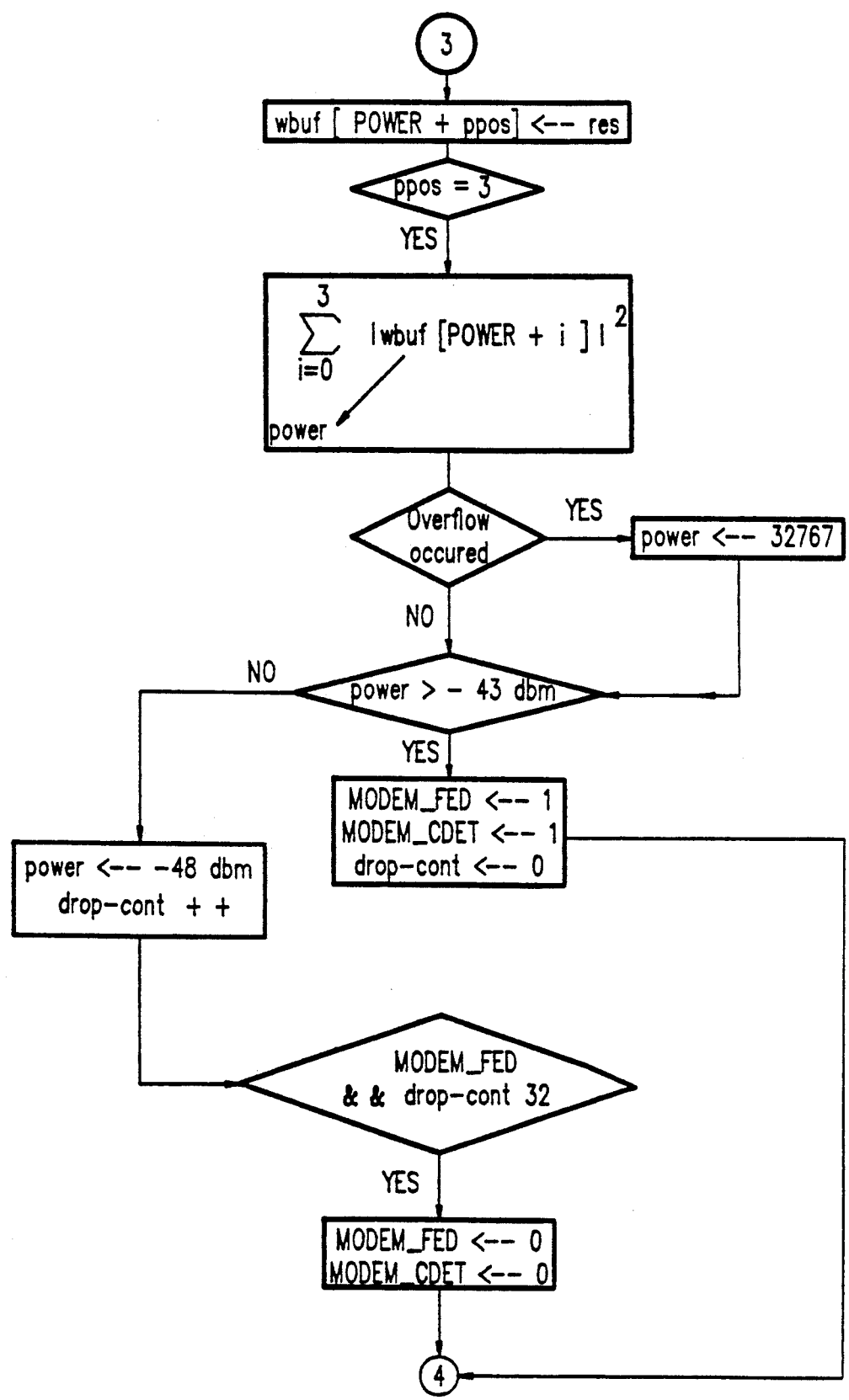
Figure 13D:
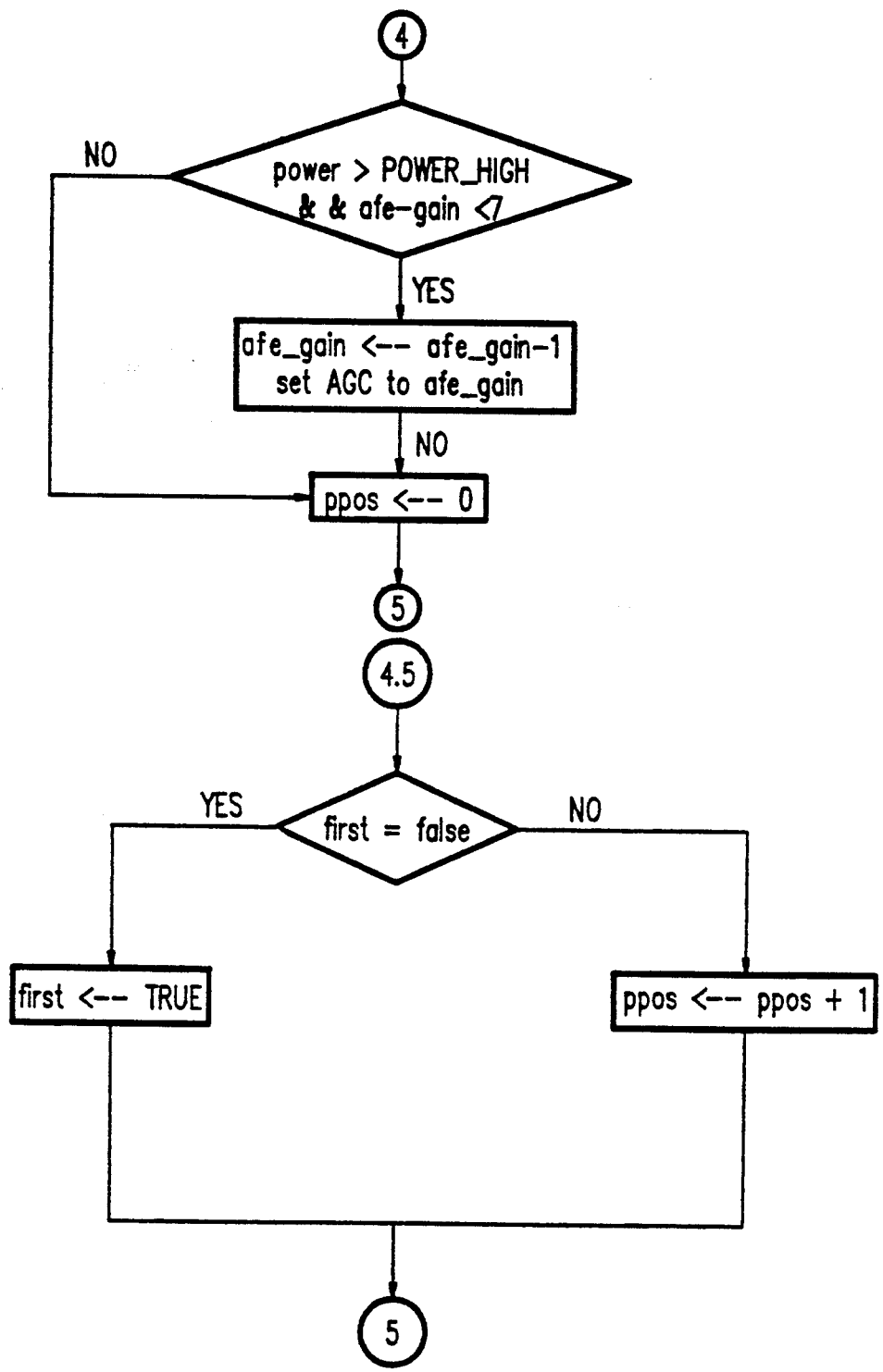
Figure 13E:
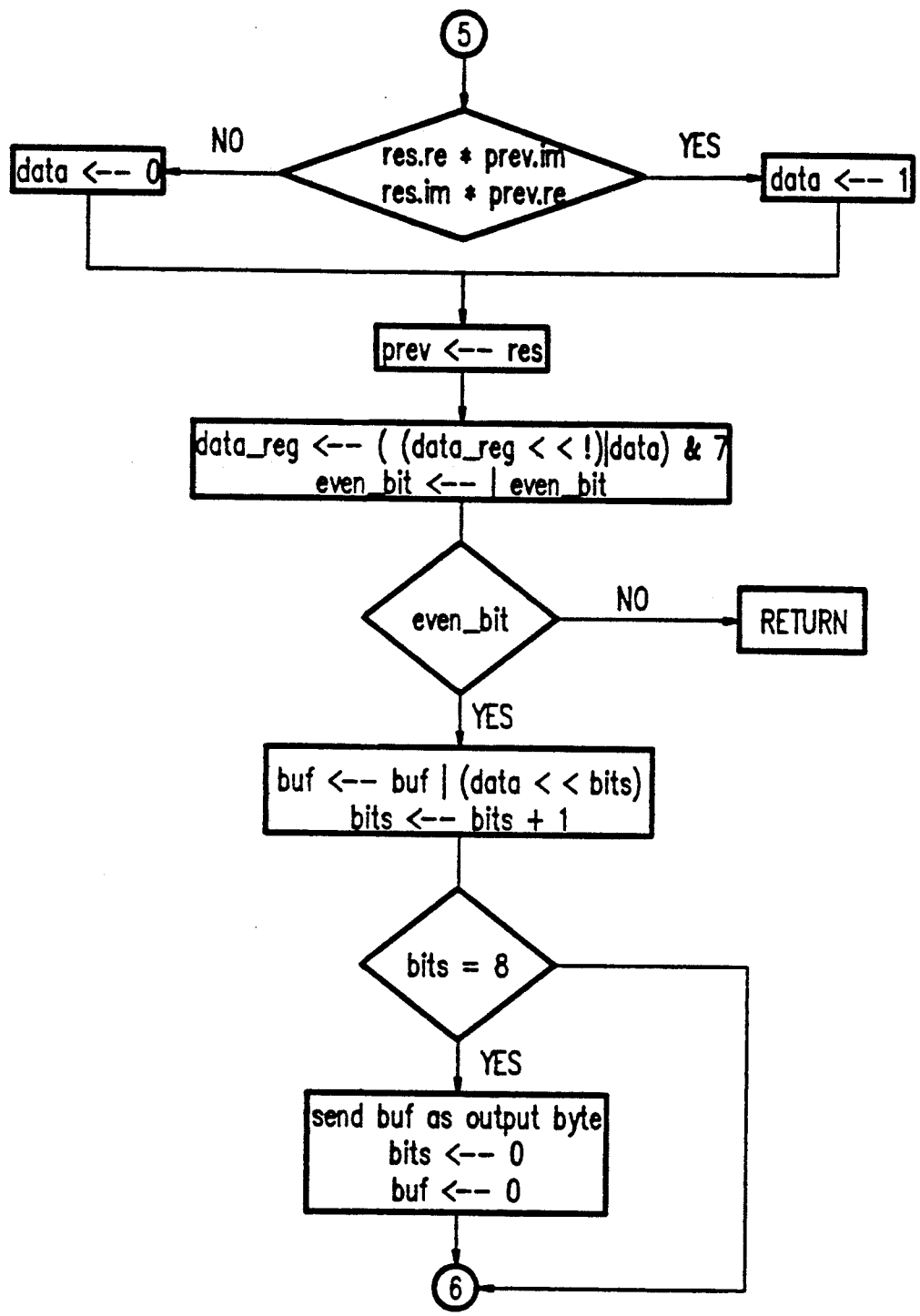
Figure 13F:
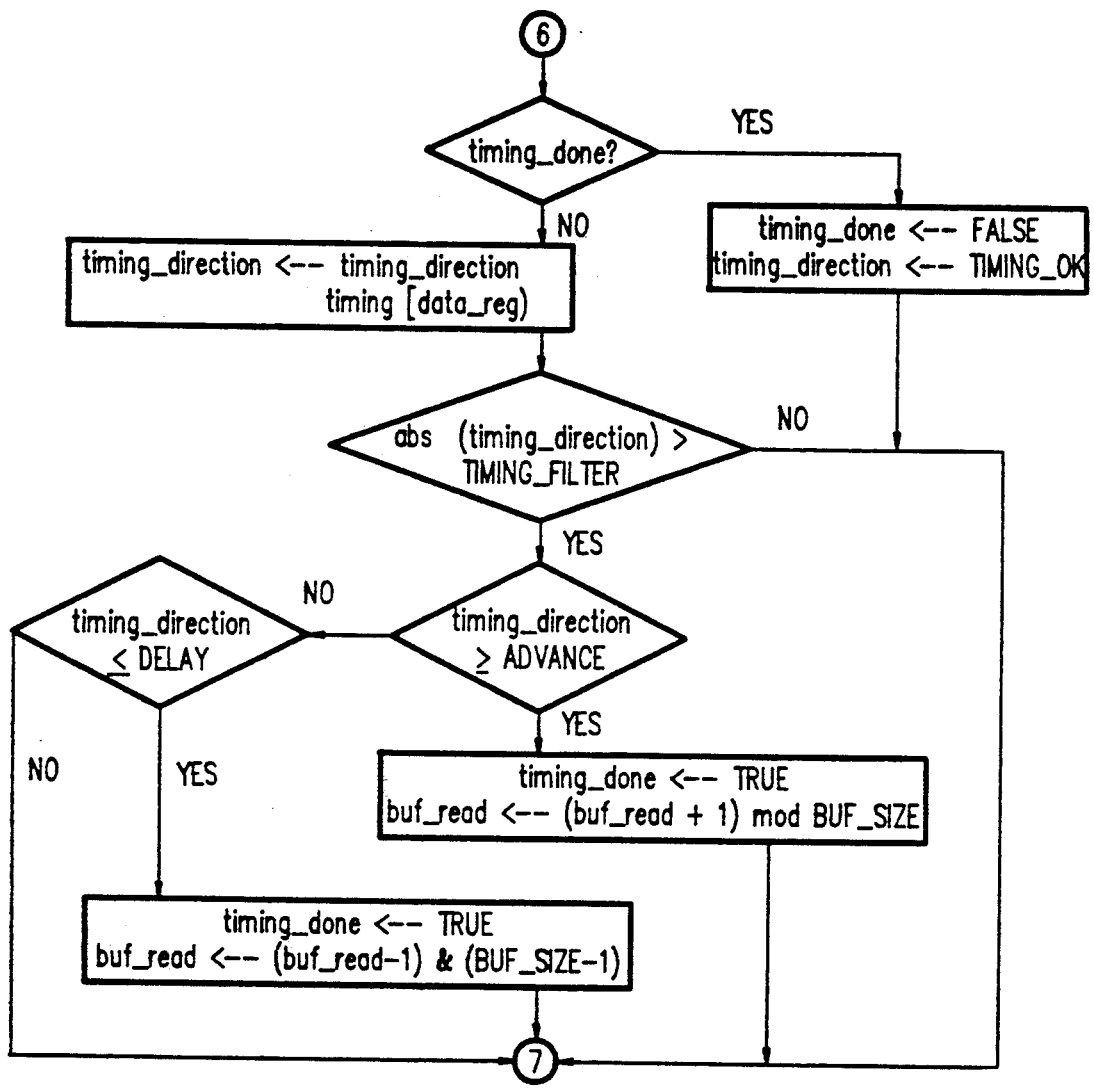
Figure 13G:
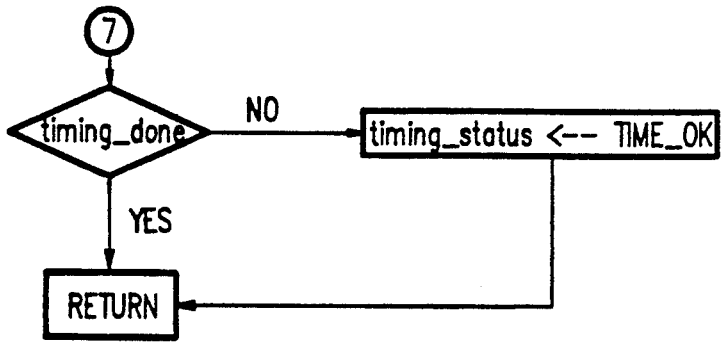

As shown in FIG. 10, and in greater detail in FIG. 11, in the complex down converter 102, sixteen samples are multiplied by a fixed complex carrier together with the previous sixteen samples convolved by the thirty-two taps finite impulse response (FIR) filter coefficients. The decimated outputs are identified as C1.Re and C1.Im. The two low pass filters, Real filter 108 and Imaginary filter 110, respectively, are performed by the system 10 in one complex FIR instruction, VCMAC (described above). Sixteen additional samples enter (T/2) and another output (C2.Re, C2.Im) is calculated.

The low pass filter is designed to reduce the bandwidth to half the Baud rate (150 Hz) and to prevent intersymbol interference.

Thus, the module 100 operates every 16 samples on the last 32 samples, generating two decision bits per real bit. One bit is the real decision and the other is a transition bit between two successive symbols. To reach this situation, as shown in FIG. 10, the last three decisions are considered. If a transition from 0 to 1 or vice-versa occurs between the 1st and 3rd bit, then the middle (2nd) bit has an equal probability of being 0 to 1. If it is 1, the timing correction is performed by moving the sample window towards the 0 bit, and vice-versa.

The timing decision is efficiently implemented by taking the three bits as an index to an 8-entry look-up table containing ADVANCE, DELAY and NO_OP directions.

Synchronization logic, controlled by the ADVANCE/DELAY signals can change the number of samples processed by the first filter to either sixteen (NORMAL), fifteen (DELAY) or seventeen (ADVANCE).

As stated above, the phase comparator 104 compares the two complex points spaced (T/2), (C1, C2). If the result is positive, one frequency is detected; if the result is negative, the second frequency is detected.

The phase comparator operation is performed by "complex multiply by conjugated" instructions which multiply the two complex points. Only the imaginary result is used. The result should be +/− 60 degrees.

FIGS. 13A-13G combine to provide a detailed flow chart of the synchronized FSK detection operation of the present invention.

The following glossary defines the symbols and terms used in the FIG. 13A-13G flowchart:

| SYMBOLS | DEFINITION |
| --- | --- |
| "rectange" symbol | perform operation |
| "rhombus" symbol | check operation |
| "circle" symbol | connection point |
| <−− | assignment operator |
| mod | modulo operator |
| =,>,< | logical operators |
| &&,\|\| | logical AND/OR |
| ++ | increment operator (C style) |
| <<,>> | left/right shifts |
| \|,& | bitwise OR/AND |
| ! | logical negation |
| DATA ELEMENT | DEFINITION |
| buffer | sample buffer |
| BUF_SIZE | size of buffer |
| AFE_DATA | analog front end data access |
| buf_write | pointer to buffer to which samples are written |
| wbuf | internal CPU memory mapped buffer, |

| | -continued |
|---|---|
| DEMOD | divided into: 32-complex numbers for demodulation and filtering |
| POWER | 4 elements for power and automatic gain control |
| Prev | previous result for decision with prev.re and prev.im indicating the real and imaginary parts respectively. |
| dpos | points to current position in DEMOD buffer |
| V21_modsin | demodulation carrier table (192 values) |
| sincos | points to current carrier position |
| ppos | points to current position in POWER buffer |
| power | energy measurement |
| buf_read | pointer to buffer from which samples are read for analysis |
| ulaw | look-up table to convert standard, 8-bit u-law encoded samples to a 14 bit linear encoding |
| res | the complex value of signal after demodulating, low-pass filtering and decimating with res.re and res.im indicate the real and imaginary parts of res respectively |
| MODEM_RED | the indicator for noting the fact that the energy in the signal is above the −43 dBm threshold |
| MODEM_CDET | the indicator for detecting the presence of the carrier |
| drop_count | a count of the number of consecutive times the received signal energy is below the threshold |
| POWER_HIGH | the power level which indicates that a gain adjustment is necessary |
| afe_gain | scaling factor for the input |
| AGC | Automatic Gain Control for scaling the input signal to avoid overflows in the processing arithmetic |
| even bit | a flag to indicate that the sampled bit is half-way between symbol periods |
| first | a flag to indicate that the sample being created is the first |
| data | a flag to indicate whether the sampled symbol should be interpreted as a one or a zero |
| data reg | the storage place for the last three samples. This is the quantity that is used to look-up the timing adjustment |
| buf | the storage location used for collecting 8 bits worth of samples to form the received byte |

Figure 14:
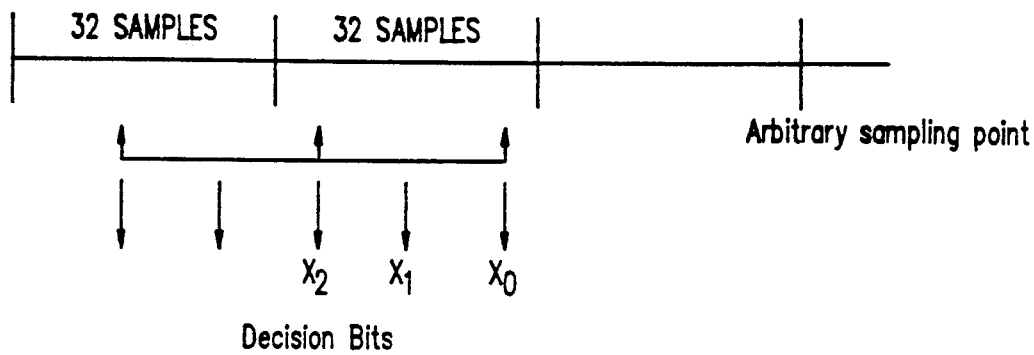
FIG. 14 is a table illustrating timing recovery in accordance with the FIG. 13A-13G flow chart.
Figure 14:
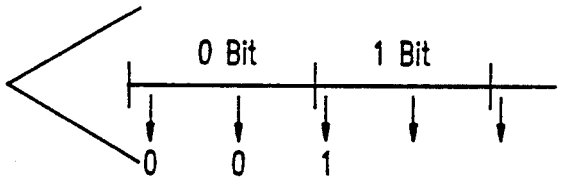

FIG. 14 illustrates the timing recovery operation.

It should be understood that various alternatives to the embodiments of the invention described herein may be employed in practicing the invention. It is intended that the following claims define the scope of the invention and that methods and apparatus within the scope of these claims and their equivalents be covered thereby.

What is claimed is:

1. A method for synchronously detecting data in a Frequency Shift Keying (FSK) signal that comprises successively transmitted symbols every symbol time period T using two baseband point per symbol, the method comprising:
   (a) down-converting the FSK signal to a complex baseband signal;
   (b) sampling the complex baseband signal at a plurality of complex points per symbol time period T to provide a plurality of complex samples;
   (c) combining the complex samples to provide a complex result every one-half symbol period T/2;
   (d) taking the sign of the complex result to provide a corresponding sign bit; and
   (e) utilizing the sign bits of the current result and the two immediately preceding results to generate commands for controlling the down-converting step (a).

2. Apparatus for synchronously detecting data in a FSK signal that comprises successively transmitted symbols every symbol time period T, the apparatus comprising:
   (a) a complex down-converter for down-converting the FSK signal to a complex baseband signal;
   (b) means for sampling the complex baseband signal at a plurality of complex points per symbol time period T to provide a plurality of complex samples;
   (c) means for combining the complex samples to provide a complex result every one-half symbol time period T/2;
   (d) means for taking the sign of the complex result to provide a corresponding sign bit; and
   (e) a command generator responsive to the sign bits of the current result and the two immediately preceding results for issuing control commands to the complex down-converter for advancing or delaying the down-converter.

* * * * *